(12) United States Patent
Chandran et al.

(10) Patent No.: US 10,120,509 B2
(45) Date of Patent: Nov. 6, 2018

(54) COMMON MODE NOISE REDUCTION IN CAPACITIVE TOUCH SENSING

(71) Applicant: STMICROELECTRONICS ASIA PACIFIC PTE LTD, Singapore (SG)

(72) Inventors: Praveesh Chandran, Singapore (SG); Lokesh Kumar Korapati, Singapore (SG); Mythreyi Nagarajan, Singapore (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 94 days.

(21) Appl. No.: 14/982,349

(22) Filed: Dec. 29, 2015

(65) Prior Publication Data
US 2017/0185182 A1 Jun. 29, 2017

(51) Int. Cl.
G06F 3/044 (2006.01)
G06F 3/041 (2006.01)
G06F 11/00 (2006.01)

(52) U.S. Cl.
CPC ............ G06F 3/044 (2013.01); G06F 3/0418 (2013.01); *G06F 2203/04102* (2013.01)

(58) Field of Classification Search
CPC ........ G06F 3/044; G06F 11/00; G06F 11/002; H03K 17/962; H03K 17/955; H03K 17/9645; G01D 5/24
See application file for complete search history.

(56) References Cited

U.S. PATENT DOCUMENTS

| | | | | |
|---|---|---|---|---|
| 8,810,546 B1* | 8/2014 | Kremin | .................. | G06F 3/0416 345/174 |
| 9,274,152 B2* | 3/2016 | Jonsson | ............. | G01R 27/2605 |
| 9,354,737 B2* | 5/2016 | Pedersen | ............... | G06F 3/0416 |
| 9,971,463 B2* | 5/2018 | Shepelev | ................. | G06F 3/044 |
| 2005/0126831 A1* | 6/2005 | Richter | .................... | G06F 3/044 178/18.01 |
| 2006/0187214 A1* | 8/2006 | Gillespie | ............. | G06F 3/03547 345/173 |
| 2006/0238521 A1* | 10/2006 | Westerman | ........... | G06F 3/0235 345/173 |
| 2008/0048997 A1* | 2/2008 | Gillespie | ............. | G06F 3/03547 345/174 |
| 2008/0158175 A1* | 7/2008 | Hotelling | .............. | G06F 3/0418 345/173 |
| 2008/0158178 A1* | 7/2008 | Hotelling | ................. | G06F 3/044 345/173 |
| 2008/0158184 A1* | 7/2008 | Land | ..................... | G06F 3/0418 345/173 |
| 2009/0153152 A1* | 6/2009 | Maharyta | ........... | G01R 27/2605 324/684 |

(Continued)

*Primary Examiner* — William Lu
(74) *Attorney, Agent, or Firm* — Seed IP Law Group LLP

(57) ABSTRACT

The present disclosure is directed to a system and method to remove common mode noise projected onto a touch sensor array from a display. The system is configured to activate two rows of electrodes at the same time, while coupling remaining rows of electrodes to ground. A first one of the two activated rows is used for detection of a touch and a second one of the two activated rows is used to detect common mode noise from the display. The common mode noise detected by the second row is removed from signals received from a plurality of columns of the touch sensor array.

18 Claims, 4 Drawing Sheets

(56) References Cited

U.S. PATENT DOCUMENTS

| | | | |
|---|---|---|---|
| 2010/0007625 A1* | 1/2010 | Jiang | G06F 3/0414 |
| | | | 345/173 |
| 2010/0060610 A1* | 3/2010 | Wu | G06F 3/044 |
| | | | 345/174 |
| 2010/0110040 A1* | 5/2010 | Kim | G06F 3/0412 |
| | | | 345/174 |
| 2011/0057670 A1* | 3/2011 | Jordan | G06F 3/0416 |
| | | | 324/679 |
| 2011/0242050 A1* | 10/2011 | Byun | G06F 3/0418 |
| | | | 345/174 |
| 2011/0261006 A1* | 10/2011 | Joharapurkar | G06F 3/0416 |
| | | | 345/174 |
| 2012/0056841 A1* | 3/2012 | Krenik | G06F 3/0418 |
| | | | 345/174 |
| 2012/0169641 A1* | 7/2012 | Wang | G06F 3/0418 |
| | | | 345/173 |
| 2012/0194204 A1* | 8/2012 | Lee | G06F 3/0416 |
| | | | 324/705 |
| 2013/0009905 A1* | 1/2013 | Castillo | G06F 3/044 |
| | | | 345/174 |
| 2013/0106779 A1* | 5/2013 | Company Bosch | G06F 3/044 |
| | | | 345/174 |
| 2013/0194232 A1* | 8/2013 | Imamura | G06F 3/044 |
| | | | 345/174 |
| 2013/0257785 A1* | 10/2013 | Brown | G06F 3/044 |
| | | | 345/174 |
| 2014/0009431 A1* | 1/2014 | Kwon | G06F 3/044 |
| | | | 345/174 |
| 2014/0145997 A1* | 5/2014 | Tiruvuru | G06F 3/044 |
| | | | 345/174 |
| 2015/0338955 A1* | 11/2015 | Hamaguchi | G06F 3/044 |
| | | | 345/174 |
| 2016/0148034 A1* | 5/2016 | Kremin | G06K 9/0002 |
| | | | 382/124 |

* cited by examiner

COMMON MODE NOISE REDUCTION IN CAPACITIVE TOUCH SENSING

BACKGROUND

Technical Field

The present disclosure is directed to a device and method to reduce noise in touch screen enabled liquid crystal displays.

Description of the Related Art

Touch screens have become ubiquitous in hand-held electronic devices. A user interacts with a display on the electronic devices simply by touching their finger or a stylus to a screen. Integrated with the display are capacitive touch sensors that detect when the user has taken an action, such as selecting an icon. As components related to the display become thinner and thinner, more and more noise interferes with the sensors of the touch screen.

BRIEF SUMMARY

The present disclosure is directed to a thin electronic device that includes a touch sensor array adjacent to a display. The display projects parasitic capacitance to the touch sensor array. The parasitic capacitance is consistent across the array, such that it is common to each of the rows and columns of electrodes of the array.

To remove this parasitic capacitance the touch sensor array includes additional circuitry coupled to one of the rows of electrodes during normal detection. This extra row is a noise detection and reduction row.

The circuitry includes a plurality of first current to voltage amplifiers, each one of the plurality of first current to voltage amplifiers is coupled to one the plurality of columns. The circuitry includes a plurality of differential amplifiers, each one of the plurality of differential amplifiers is coupled to one of the plurality of first current to voltage amplifiers. The circuitry also includes a second current to voltage amplifier configured to be coupled to one of the plurality of rows, an output of the second current to voltage amplifier being coupled to each one of the plurality of differential amplifiers.

This and other embodiments of the present disclosure are discussed in more detail below.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

Figure 1:
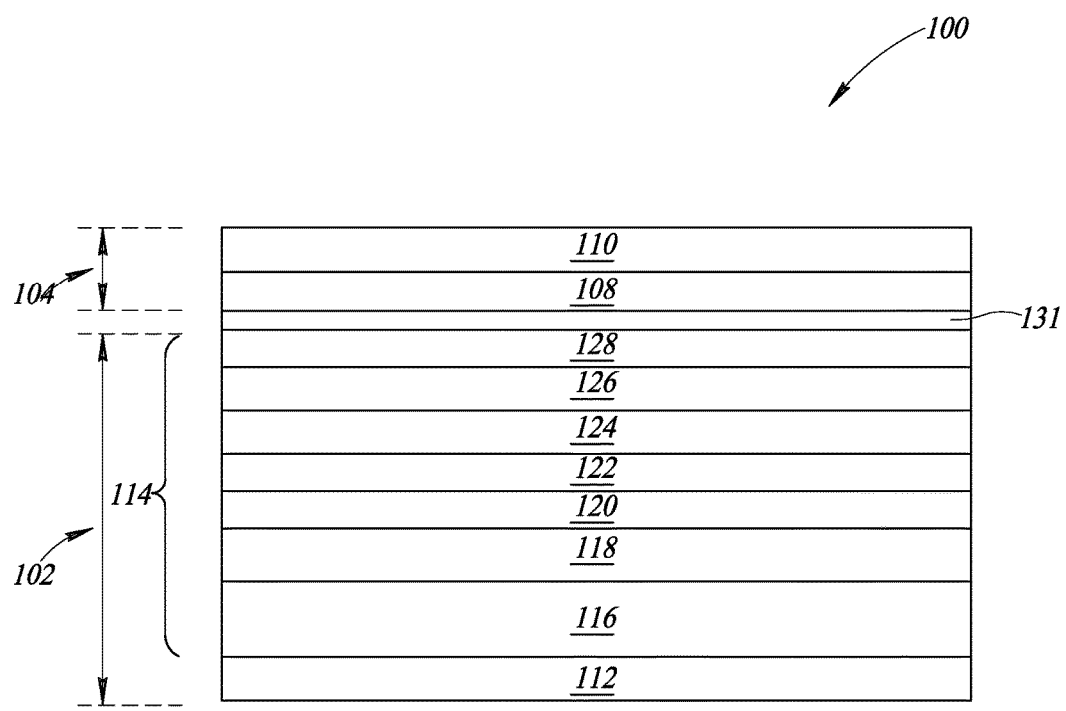
FIG. 1 is a stack of layers of an electronic device having a display and a touch sensor array.

In the following description, certain specific details are set forth in order to provide a thorough understanding of various embodiments of the disclosure. However, one skilled in the art will understand that the disclosure may be practiced without these specific details. In other instances, well-known structures associated with touch screen electronic have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

The present disclosure is directed to reducing parasitic capacitance (noise) detectable in an electronic device 100 that includes a touch sensor array 104, which originates from pixels in an associated display 102. This parasitic capacitance occurs throughout the touch sensor array 104 and occurs at each refresh of the display or in other words, every time a pixel changes. The touch sensor array 104 includes a plurality of rows and columns, for example, rows 204 and columns 206 in FIG. 3. The rows and columns may be referred to as transmitter channels and receiver channels in this disclosure.

The parasitic capacitance is common to all of the transmitter and receiver channels in the electronic device, in that the noise may be referred to as common mode noise. This common mode noise is the same across each receiver channel (columns 206).

As the electronic device 100 is made to be thinner and thinner, the noise that affects the touch sensor array increases. In some instances, the noise is so large that it can saturate the receiver channel outputs, overwhelming and saturating the system.

The present disclosure is directed to reducing or removing this noise or parasitic capacitance, giving manufacturers the opportunity to make extremely thin displays. The aspect of the present disclosure may be utilized with flexible or bendable displays. These displays are moving from a spacing of 100 microns between the display and the touch sensor electrodes to a spacing of 8 microns to 10 microns. This decrease in distance can increase the capacitance detected from noise 10 fold.

FIG. 1 is a simplified cross-sectional representation of layers of the electronic device 100 that includes a display 102 integrated with a touch sensor array 104. The electronic device may be a cell phone, tablet computer, or any other device that allows a user to both view information and interact with the information on a shared surface. This shared surface is often referred to as a touch screen or touch panel. In particular, the display is configured to display information, such as a photograph, icons, or text. The touch sensor array 104 is a clear panel positioned on the display such that the user can see the display. The touch sensor array 104 is configured to detect with electrodes, such as with capacitive detection, when and where the user touches the display.

The touch sensor array 104 includes an electrode array layer 108 that is covered by a glass or other protective clear layer 110. The glass layer 110 may be 500 to 700 microns thick.

The display 102 includes an illumination panel 112, which is covered by a plurality of layers 114. The plurality of layers 114 will include a variety of layers depending on the properties of the display. For example, the display 102 in FIG. 1 is a liquid crystal display that includes a first polarizing layer 116, a thin-film transistor layer 118, a liquid crystal layer 120, an organic layer 122, an indium tin oxide layer 124, a glass layer 126, and a second polarizing layer 128. An optically clear adhesive 131 is positioned between the second polarizing layer 128 and the touch sensor 104.

As these layers for the display become thinner and thinner and different materials and technologies are developed, noise from the display affects the sensitivity and output of the touch screen array. Some displays are moving towards being flexible, extremely thin products, such that reduction of noise from the close proximity of the display components to the touch sensors is becoming increasingly important.

Figure 2:
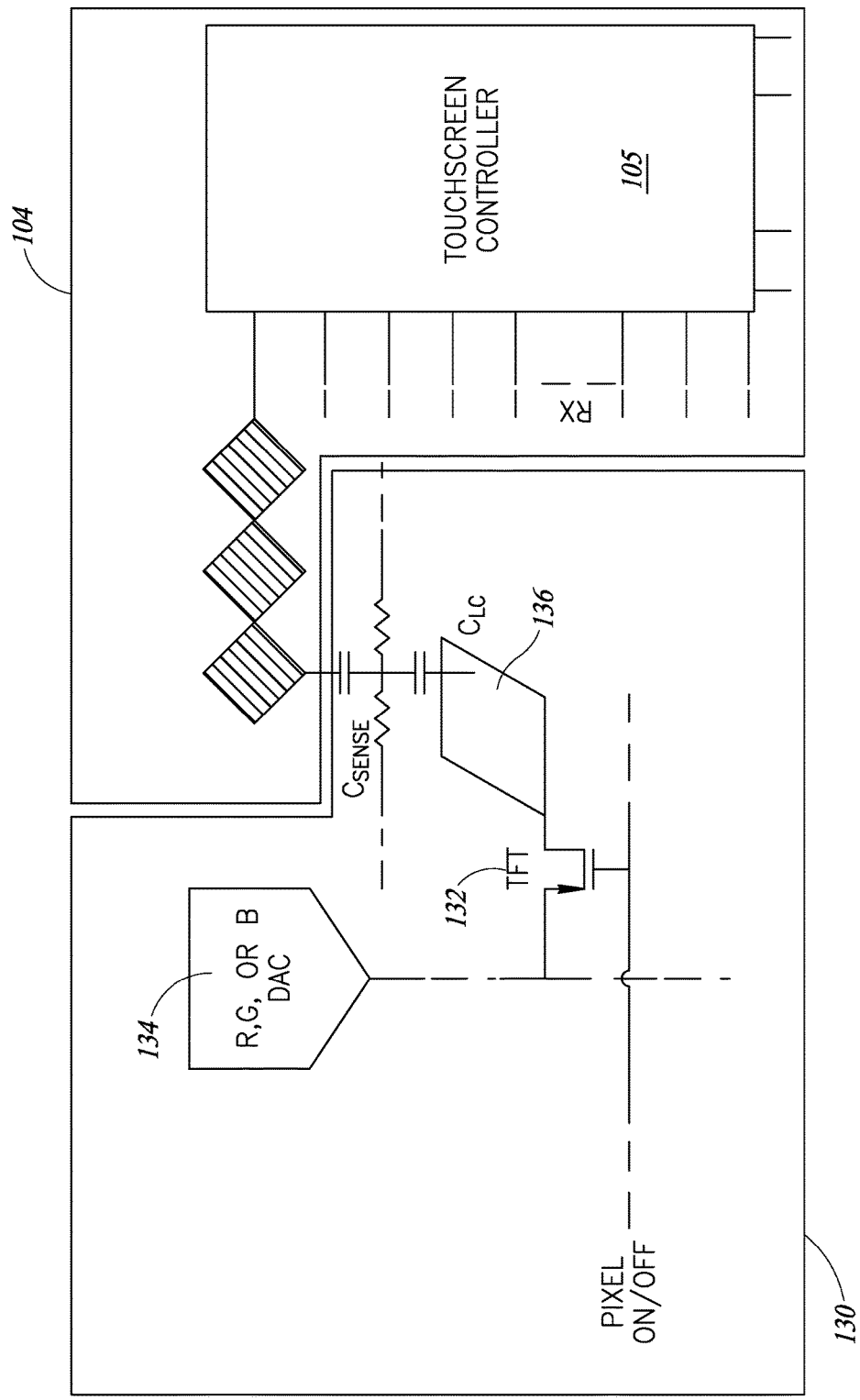
FIG. 2 is a block diagram of circuitry associated with the display and the touch sensor array.

FIG. 2 is a representation of the interactions between a liquid crystal display circuit 130 and the touch sensor 104, which result in noise or parasitic capacitance. The touch sensor 104 includes a touch sensor controller 105 that is configured to receive signals from the plurality of columns 206 and the plurality of rows 204 of the touch sensor array 200, referring to FIG. 3. The touch sensor controller 105 is also configured to activate and deactivate ones of the plurality of rows and columns in accordance with the present disclosure to detect capacitance from the user's touch and remove or reduce noise.

The display circuit 130 includes a variety of components, which are not described in detail in this disclosure. The components include digital to analog converters 134 associated with red, green, and blue color display. Thin film transistors 132 are positioned between the digital to analog converter and sub-pixel electrodes 136. Noise, or parasitic capacitance, $C_{SENSE}$ is generated between the sub-pixel electrodes 136 and the touch sensor 104 such that capacitance is projected from the display to the touch sensor 104. This parasitic capacitance creates inaccurate readings of capacitance. The parasitic capacitance is inversely proportional to the distance between the display and the electrodes of the touch sensor, such that as the displays become smaller and thinner, the amount of parasitic capacitance increases significantly.

Anytime the display is updated or refreshed, noise is created between the display and the touch sensor. For example, when pixels change to a new color, noise is created. In other words, capacitance based on the pixel change is detected by the touch screen array, which can create false capacitance (an unintended touch may be detected).

As noted above, new displays are becoming more thin, increasing the pixel density, and the overall number of pixels, so the switching noise as the larger number of pixels are changed is more significant. Noise caused by the pixels is basically uniform across the display (common mode). The present disclosure is directed to improving the signal to noise ratio of these electronic devices that have a display very close to the touch sensors.

Figure 3:
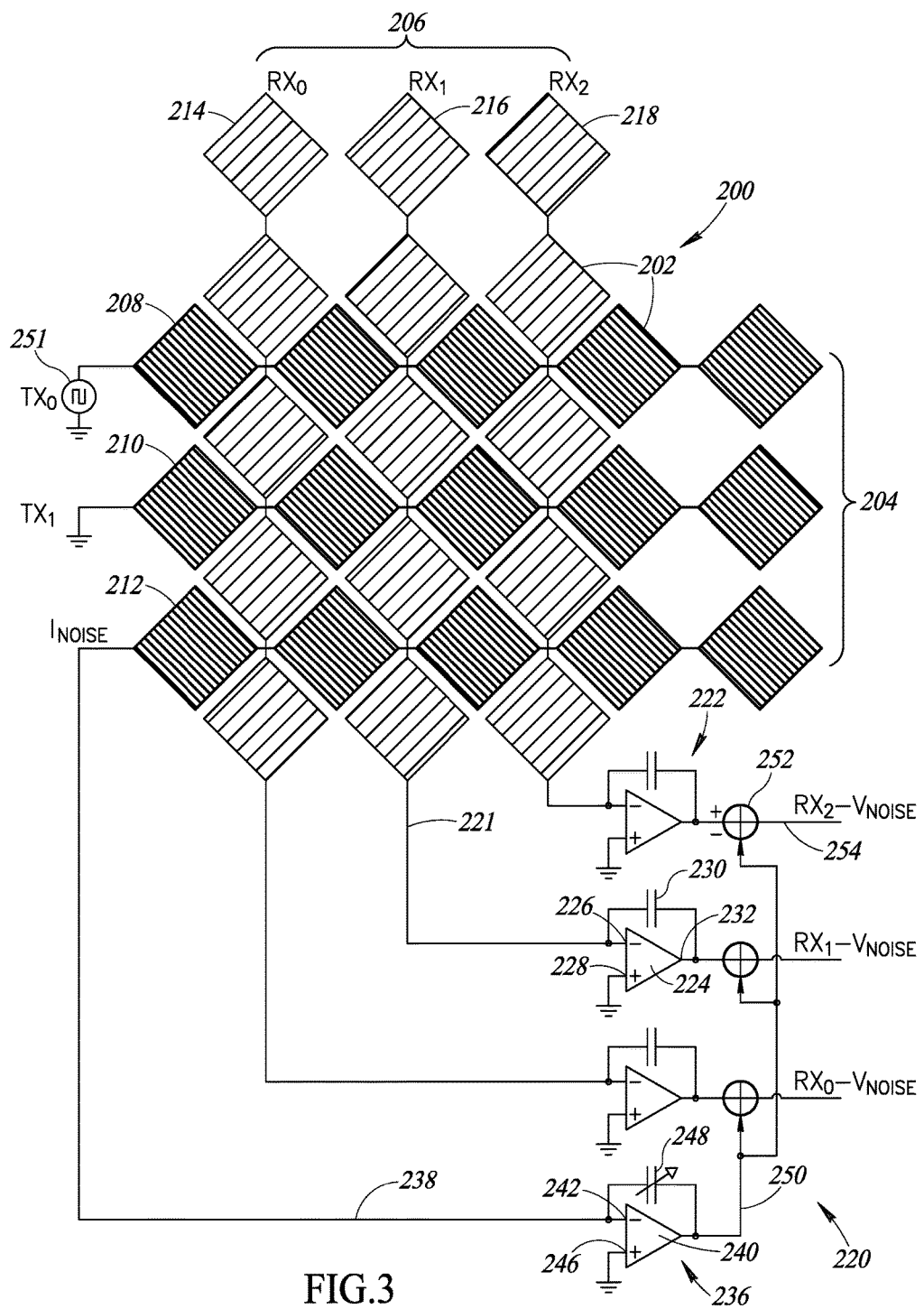
FIG. 3 is a portion of the touch sensor array and associated circuitry according to an embodiment of the present disclosure.

FIG. 3 is a portion of a touch sensor array 200 that is configured to be included in a thin electronic device, such that the touch sensor array 200 is very close to a display panel. The touch sensor includes a plurality of electrodes 202 arranged in rows 204 and columns 206. This simplified view of the touch sensor includes three rows 208, 210, 212 and three columns 214, 216, 218. The rows may be referred to as transmitter channels TX while the columns may be referred to as receiver channels RX.

In an actual device, there are significantly more rows and columns. The rows and columns each include linearly aligned, diamond shaped electrodes. Alternative shapes for the electrodes are envisioned. The rows and column overlap each other so that an area near an intersection of the rows and columns is configured to detect capacitance between adjacent row and column electrodes. Ultimately, a change in capacitance can be detected and interpreted to respond to a user's selection or touch.

Circuitry 220 receives analog current signals 221 from each of the plurality of columns. The signals are affected by which one of the rows or transmitter channels are activated. The circuitry 220 is directed to compensating for the noise with a voltage by converting the current signals to a voltage and removing the noise. In particular, the circuitry 220 includes a plurality of current to voltage amplifiers 222. The current to voltage amplifiers 222 include an operational amplifier 224 that receives the current signals in its inverting input 226. A non-inverting input 228 of the operational amplifier 224 is coupled to ground. An output 232 of the operational amplifier is coupled to a capacitor 230, which is coupled to the inverting input of the operational amplifier. There is a current to voltage amplifier 222 for each column of electrodes 206, i.e. a current to voltage amplifier for each receiver channel.

The circuitry includes at least one additional, noise-reducing current to voltage amplifier 236. That is there is at least one more current to voltage amplifier in the system than there are columns of electrodes. If there are n columns, then there are at least n+1 current to voltage amplifiers.

The additional, noise-reducing current to voltage amplifier 236 is coupled to one of the rows of electrodes (one of the transmitter channels). In FIG. 3, the current to voltage amplifier 236 is coupled to the third row 212. The current to voltage amplifier receives a current 238 from this row that is indicative of the overall noise from the display, or parasitic capacitance caused by pixels of the display. This current represents noise across the whole system.

This additional current to voltage amplifier 236 includes an operational amplifier 240 that has an inverting input 242 that receives the signal 238 and a non-inverting input 246 that is coupled to ground. A capacitor 248 is coupled between an output 250 of the operational amplifier and the inverting input 242. The output 250 is a voltage representative of noise in the touch sensor system. The output 250 is combined with each of the voltage outputs of the current to voltage amplifiers 222 that are coupled to the columns of electrodes. The voltage from the noise-reducing circuitry is subtracted or removed from the voltage output from the receiver channel circuitry.

Each receiver channel circuitry also includes a differential amplifier 252 that receives the output 232 of the column current to voltage amplifier 222 and receives the output 250 of the noise-reducing current to voltage amplifier 236. An output 254 from each differential amplifier is a voltage representative of that column minus voltage attributed to noise, i.e., $RX_2-V_{NOISE}$. Accordingly, the output 254 is the signal attributable to the actual capacitance associated with a touch on the touch sensor without noise (or reduced by a fraction of the noise) caused by the display.

The touch sensor array 200 is configured to rotate which row is coupled to the noise-reducing current to voltage amplifier 236 as the touch sensor array 200 cycles through the rows. For example, in a system that has m rows, a first row 208, $TX_0$, is activated. For example, a current source 251 may be coupled to the first row. A second row 212, physically spaced from the first row 208, is coupled to the noise-reducing current to voltage amplifier 236. The remaining rows, m−2 are all coupled to ground, such as row 210, $TX_1$. The sensor systematically cycles through and activates one of the rows at a time to detect capacitive touches by the user. When one of the rows is activated, a second one, spaced from the first one is coupled to the noise-reducing current to voltage amplifier 236 to remove the noise created by the pixels of the display. The touch screen controller of FIG. 2 is configured to control the touch sensor array and activate and deactivate the rows and columns.

In prior systems, there is no differential measurement associated with one of the rows (transmitter channels) to each of the columns (receiver channels). In particular, touch detection was performed by activating a first row, $TX_0$ and coupling all remaining rows ($TX_1$ and $TX_2$) to ground. Next all of the columns $RX_0$-$RX_2$ are activated at the same time and measurements for each intersection of the activated row $TX_0$ with each column are output $OX_0$-$OX_2$. This is repeated for each row. A single row is activated at a time and all of the columns are activated in conjunction with the single row. The capacitance is measured between the activated row and column electrodes.

As noted above, the present disclosure is directed to activating a first row and a second row, where the second row is utilized to remove noise. This method and circuit structure is configured to measure the signal and the noise. The noise is then removed or reduced from each of the receiver/column channels. Accordingly, by activating one of the rows as a noise detection and reduction channel, separate from the driven row, noise can be detected and subtracted or otherwise removed from the receiver outputs.

Figure 4:
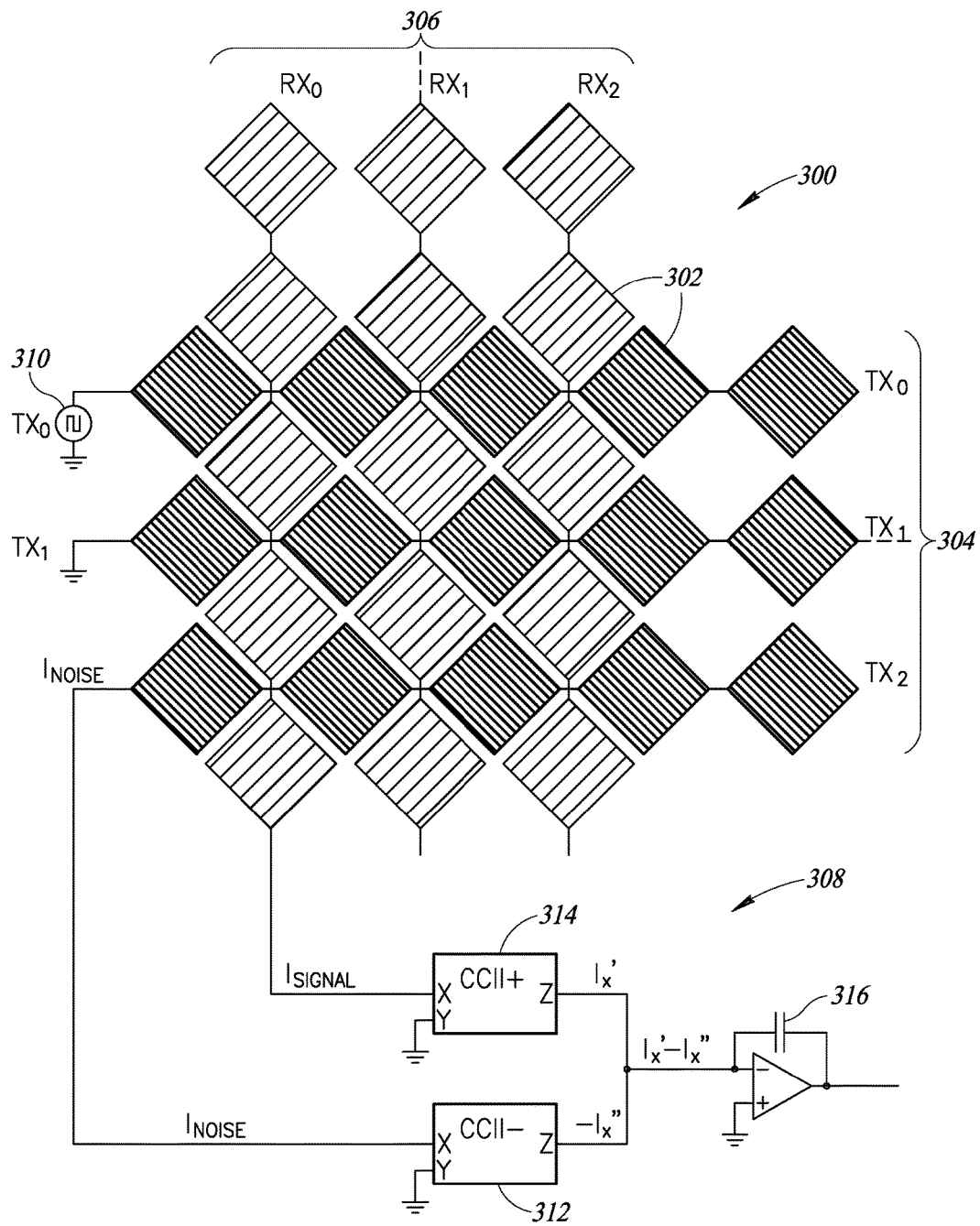
FIG. 4 is an alternative embodiment of the touch sensor array and associated circuitry according to the present disclosure.

FIG. 4 is directed to an alternative circuit structure to compensate the receiver outputs with a current as opposed to the voltage compensation described above. FIG. 4 includes a touch sensor array 300 that includes a plurality of electrodes 302 arranged in rows 304 and columns 306. Circuitry 308 is configured to remove noise from the touch sensor array 300, such as parasitic capacitance from a coupled liquid crystal display.

As described above, a first rows $TX_0$ is coupled to a current source 310. A second row $TX_2$ is coupled to the circuitry 308 and all remaining rows are coupled to ground, such as $TX_1$. The second row is physically spaced from the first row that is currently coupled to the current source. Current $I_{NOISE}$ from the second row is fed into a first current conveyor circuit 312. A first input of the current conveyor circuit 312 receives the signal $I_{NOISE}$ and a second input is coupled to ground. A current output from each row, for example, $I_{SIGNAL}$, is received as a first input into a second current conveyor circuit 314. The current $I_{NOISE}$ is inverted by the current conveyor circuit 312 and then added to the signal current. This removes the noise from the signal current. The remaining current, indicative of the actual current associated with a user's touch is then processed by a current to voltage converter 316.

The current conveyor 314 outputs a current the same as the input current. The current conveyor 312 outputs a current that is the input current inverted, i.e. the sign is changed. The differential current is fed into the next stage and noise is cancelled before the current to voltage conversion. A similar process is performed for each column to remove noise from each column. In addition, as different rows are activated for detection of capacitance (as the first row) and the second row, spaced from the first row is activated as a noise detection row, the sensor array will cycle through all of the rows to detect where a user has touched the sensor.

The present disclosure allows current touch sensor array designs to be adapted to accommodate for thinner end packaging with a display. The touch screen controller drives a first transmitter channel for detection and activates a second transmitter channel for common mode noise detection. Differential measurement removes the common mode noise from the signals received from the receiver channels. The second transmitter channel changes with each sweep of the sensor array. This second transmitter channel is selected to be far from the driven transmitter channel to avoid or minimize capacitive coupling from the driven transmitter channel.

Deciding which transmitter channel to activate for detection and which transmitter channel to activate for noise reduction can be achieved with predictive touch. In particular, the first transmitter channel for detection should be close to where the user's last touch was detected. The second transmitter channel for noise should be spaced from the first transmitter channel, i.e. spaced from the most recent touch detected. An analog multiplexer, controlled by a digital processor, such as an ASIC, may control which row is activated.

The system may do a preliminary detection of where the user's finger is located and activate based on the preliminary detection. Alternatively or in addition, the system may use the latest information about the user's finger. This preliminary self-sensing may be achieved by using a one dimension sweep, drive one row and one column. Alternatively, all columns may be driven at one time to create a one dimensional map. This could be a one dimensional vertical map that is compared to a one dimensional horizontal map. The maps being generated from a vertical sweep of the electrodes and a horizontal sweep of the electrodes.

The present disclosure may include a programmable gain setting. For example, some amount of noise should be removed before the processing circuitry, such as an ASIC (application specific integrated circuit) receives the digital signals after the differential measuring. A noise reduction of 50% or 60% may be selected. Each processing system can handle a different amount of noise. The gain scaling can provide flexibility of this technique is different applications.

The present disclosure simplifies the digital processing side in the ASIC, minimizing the filtering needed because the noise is removed on the analog side. This can save silicon area on the ASIC, simplifying the chip, and reducing the size of the chip.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a touch sensor array that includes:
  a current source;
  a plurality of rows, each row having a plurality of electrodes electrically coupled to each other, each of the plurality of rows being electrically isolated from remaining rows of the plurality of rows, the touch sensor, in operation, cycles through and activates one of the plurality of rows at a time, and electrically couples an activated row to the current source;
  a plurality of columns, each column having a plurality of electrodes electrically coupled to each other, each of the plurality of columns being electrically isolated from remaining columns of the plurality of columns;
  a plurality of first current to voltage amplifiers, each one of the plurality of first current to voltage amplifiers electrically coupled to one the plurality of columns;
  a plurality of differential amplifiers, each one of the plurality of differential amplifiers electrically coupled to one of the plurality of first current to voltage amplifiers; and
  a second current to voltage amplifier, an output of the second current to voltage amplifier being electrically coupled to each one of the plurality of differential amplifiers, the touch sensor, in operation, electrically couples an inactivated row of the plurality of rows to an input of the second current to voltage amplifier while the activated row is electrically coupled to the current source, the touch sensor, in operation, grounds remaining rows of the plurality of rows while the activated row is electrically coupled to the current source and the inactivated row is electrically coupled to the input of the second current to voltage amplifier, the inactivated row being separated from the activated row by at least one of the remaining rows.

2. The device of claim 1, further comprising a transparent layer on the touch sensor array.

3. The device of claim 2, further comprising a display, the touch sensor array being positioned between the transparent layer and the display.

4. The device of claim 3 wherein the display includes a polarizing layer and a thin film transistor layer.

5. The device of claim 3 wherein the display is flexible.

6. The device of claim 3 wherein a distance between the display and the touch sensor array is less than 10 microns.

7. A method, comprising:
reducing parasitic capacitance in a touch sensor from a display, the reducing including:
  electrically coupling a first row of electrodes of a plurality of rows of electrodes to a current source;
  electrically coupling, while the first row of electrodes are electrically coupled to the current source, a plurality of columns of electrodes to a plurality of first amplifiers of a noise-reducing circuit;
  electrically coupling, while the first row of electrodes is electrically coupled to the current source and the plurality of columns of electrodes are electrically coupled to the plurality of first amplifiers, a second row of electrodes of the plurality of rows of electrodes to a second amplifier of the noise-reducing circuit; and
  electrically coupling, while the first row of electrodes is electrically coupled to the current source, the plurality of columns of electrodes are electrically coupled to the plurality of first amplifiers, and the second row of electrodes is electrically coupled to the second amplifier, remaining rows of the plurality of rows of electrodes to ground, at least one of the remaining rows of the plurality of rows of electrodes separating the first row of electrodes from the second row of electrodes.

8. The method of claim 7, further comprising detecting a touch by a user with the plurality of column electrodes.

9. The method of claim 8, further comprising determining a third row of electrodes to activate based on a location of the touch.

10. The method of claim 7, further comprising:
electrically coupling the second row of electrodes to the current source;
electrically coupling, while the second row of electrodes is electrically coupled to the current source and the plurality of columns of electrodes are electrically coupled to the plurality of first amplifiers, a third row of electrodes to the second amplifier; and
electrically coupling, while the second row of electrodes is electrically coupled to the current source, the plurality of columns of electrodes are electrically coupled to the plurality of first amplifiers, and the third row of electrodes is electrically coupled to the second amplifier, remaining rows of the plurality of rows of electrodes to ground.

11. The method of 7, further comprising:
receiving, by the plurality of first amplifiers, a plurality of output signals from the plurality of columns of electrodes;
receiving, by the second amplifier, an output signal from the second row of electrodes; and
removing, by the noise-reducing circuit, noise from the plurality of output signals from the plurality of columns of electrodes using the output signal from the second row of electrodes.

12. A system, comprising:
a display;
a touch sensor array coupled to the display, the touch sensor array including:
  a current source;
  a plurality of rows of electrodes, each of the plurality of rows of electrodes including a plurality of electrodes electrically coupled to each other, the plurality of rows of electrodes being electrically isolated from each other, a first row of electrodes of the plurality of electrodes being electrically coupled to the current source;
  a plurality of columns of electrodes, each of the plurality of columns of electrodes including a plurality of electrodes electrically coupled to each other, the plurality of columns of electrodes being electrically isolated from each other; and
  a plurality of amplifiers, a first one of the plurality of amplifiers being electrically coupled to a second row of the plurality of rows of electrodes and each remaining amplifier being electrically coupled to one of the plurality of columns of electrodes, remaining rows of electrodes of the plurality of electrodes being grounded, the first row of electrodes and the second row of electrodes being spaced from each other by at least one of the remaining rows of electrodes.

13. The system of claim 12, wherein the touch sensor array includes a plurality of differential amplifiers, each differential amplifier electrically coupled to the first one of the plurality of amplifiers.

14. The system of claim 13 wherein each differential amplifier is electrically coupled to one of the remaining amplifiers that are electrically coupled to the ones of the plurality of columns of electrodes.

15. The system of claim 12, further comprising a touch sensor controller configured to activate and deactivate the plurality of rows and columns of electrodes of the touch sensor array.

16. The system of claim 12, further comprising an application specific integrated circuit coupled to the remaining amplifiers that are coupled to one of the plurality of columns of electrodes.

17. The system of claim 12 wherein the display is a liquid crystal display.

18. The system of claim 12 wherein the plurality of columns of electrodes includes a first number of columns, and the plurality of amplifiers includes a second number of amplifiers that is greater than the first number.

\* \* \* \* \*